(12) United States Patent
Liao et al.

(10) Patent No.: US 6,681,005 B2
(45) Date of Patent: Jan. 20, 2004

(54) DEVICE FOR MANUFACTURING LIQUID CRYSTAL DISPLAY PANEL

(75) Inventors: Bing-Jei Liao, Pingtung (TW); Chung-Yuan Liu, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 113 days.

(21) Appl. No.: 09/973,949

(22) Filed: Oct. 11, 2001

(65) Prior Publication Data

US 2002/0186343 A1 Dec. 12, 2002

(30) Foreign Application Priority Data

Jun. 12, 2001 (TW) .................................. 90114213 A

(51) Int. Cl.$^7$ .................................................. G02F 1/13
(52) U.S. Cl. .................................................. 379/187
(58) Field of Search ........................... 349/187; 100/50, 100/90, 93, 211; 156/358

(56) References Cited

U.S. PATENT DOCUMENTS 5,231,923 A * 8/1993 Ohta et al. ..................... 100/46
5,558,015 A * 9/1996 Miyashita et al. .............. 100/50
5,629,787 A * 5/1997 Tsubota et al. ................ 349/153

* cited by examiner

Primary Examiner—James Dudek
(74) Attorney, Agent, or Firm—Rabin & Berdo, P.C.

(57) ABSTRACT

An apparatus for manufacturing a liquid crystal display (LCD) panel with a uniform cell gap includes a pressurized device, a pressure distribution device and provide heat distribution. The pressurized device is used for assembling a first substrate and a second substrate of the LCD, and further used for heating the LCD panel, wherein the pressurized device is disposed on at least one of the first and second substrates. The pressure distribution device is used for distributing pressure imposed by the pressurized device evenly on a non-display area of the LCD panel so as to form a uniform cell gap. The pressure distribution device is disposed between the pressurized device, and one of the first and second substrate. The heat distribution device is disposed between the pressurized device, and one of the first and second substrate. The pressure distribution device can be a mask with a substantially same pattern as a non-display area of the LCD panel, and includes a number of dents corresponding to a display area and trenches connecting the dents and communicating with the external atmosphere.

7 Claims, 6 Drawing Sheets

DEVICE FOR MANUFACTURING LIQUID CRYSTAL DISPLAY PANEL

This application incorporates by reference Taiwanese application Serial No. 90114213, Filed Jun. 12, 2001.

BACKGROUND OF THE INVENTION

1. Field of the Invention

This invention relates to a device for manufacturing a liquid crystal display (LCD) panel and a fabrication method therefor, particularly to a method capable of forming a uniform cell gap.

2. Description of the Related Art

Compared to a conventional display panel, the liquid crystal display (LCD) panel has the potential of lightweight, low power consumption and high resolution for which are generally beloved by the consuming public. Also, the other portable products, such as personal digital assistant (PDA) and cellular phone, enjoy a rapid growth in the market. With the increasing demand, the image display of those portable products is expected to have the same resolution as that of a personal computer. For example, the liquid crystal on silicon (LCOS) panel, which generally applies to a small display panel, is a panel composed of a silicon substrate and a glass substrate with liquid crystal injected between. As such LCOS panel differs from the common liquid crystal panel that utilizes two substrates both made of glass, it can be smaller and lighter and can provide a high-resolution display quality. The resolution of a LCOS panel is shown by the number of pixels, similar to a liquid crystal panel; that is, the more pixels it possesses the higher resolution it displays. Furthermore, the semiconductor process, like the CMOS technology, finds application in the production of the driving circuit of pixels in a LCOS panel. By this method, the silicon wafer as the substrate can be manufactured in employing the 0.35 um semiconductor process. Thus, there is no need to throw in extra investment in production equipment, and the display resolution of a LCOS panel is greater than that of a glass-substrate liquid crystal panel.

Generally, the LCOS panel has two basic types: transmissive and reflective. Nevertheless, the most research and development work is centered on the reflective LCOS panel. Referring to FIG. 1, it is a sectional view of a pixel of a reflective LCOS panel. The LCOS panel comprises a first plate 100 and a second plate 101, wherein said second plate 101 made of a silicon substrate 102 consists of a thin film transistor (TFT) 106 for controlling pixel movement, a light shielding film 107 for blocking light irradiation on the TFT, a capacitor 108 for sustaining pixel brightness, a metal layer 111 in connecting the TFT 106 with the capacitor 108, an insulating layer 109 capping the metal layer 111, a pixel electrode 110, and a reflector 112, and wherein the second plate 100 made of a glass substrate 120 includes a transparent electrode (ITO) 118. The first substrate 100 and the second substrate 101 are assembled and inserted with a liquid crystal molecule 115 to form a liquid crystal layer 114 in between the two substrates. In addition, an orientation film 113 and 116 are formed above the reflector 112 and beneath the ITO 118, respectively.

With reference to FIG. 1, the incoming light passing through the liquid crystal layer 114 (as shown in Arrow I) directly emerges from the glass substrate 120 via the reflector 112 (as shown in Arrow O). With the variance of voltage charged on the pixel electrode 110, the liquid crystal molecule 115 changes its alignment, so as to control the polarization of light passing through the liquid crystal layer 114. Therefore, the emerging light will, through the application of the polarizer (not shown in FIG. 1) disposed above the substrate 120, be visible.

Referring to FIG. 2 which is a schematic diagram of FIG. 1, the LCOS panel consists of the glass substrate 120 and the silicon substrate 102, both of which possess a plurality of corresponding pixel electrodes, such as pixel electrodes 204a and 204b, and the cell gap H, the distance between the corresponding pixel electrodes, is inserted with the liquid crystal (other elements are omitted in FIG. 2). The optical effect of the liquid crystal will vary with the width of the cell gap. An uneven cell gap between the substrates resulting in the interfering ring visible to the naked eyes is called "Newton ring" that may cause injury to the display effect of the LCOS pixel.

Moreover, unlike the large size LCD panel, the LCOS application is aimed at the small size panel, such as the projector or the LC panel used in projection TV. The LCOS panel with general pixel size of 0.7 inch, 0.9 inch or 1.3 inch needs to amplify its image to 60 to 100 inch if applied to projection TV. Under such a high amplification rate, the imperfection shown in the applied product will become even more conspicuous once the display effect of the panel itself is not so satisfactory. Therefore, an important goal for research efforts is retaining a uniform cell gap H that is to control the space between the glass substrate 120 and the silicon substrate 102.

Typically, the solution to the problem of an uneven cell gap is to apply spacers randomly between the liquid crystal layers. FIG. 3 depicts the sectional view of a traditional LCOS panel. The LCOS panel consists of a glass substrate 320 and a silicon substrate 302 with a liquid crystal layer 306 inserted in between. A plurality of corresponding pixel electrodes, like electrodes 304a and 304b, is arranged between the substrates, wherein the cell gap H between electrodes 304a and 304b is upheld by virtue of disposing spacers 308. When the glass substrate 320 and the silicon substrate 302 are uneven or suffer external pressure, the spacers can prevent a direct contact of the two substrates. Meanwhile, this method incurs many shortcomings that, in addition to the need for strictly controlling the particle size of each spacer, these randomly disposed spacers are inclined to gather in particular place during liquid crystal injection, thereby failing to produce a uniform cell gap H. Moreover, in its application in projection TV, the disposed spacers that incidentally fall above the pixel will result in tiny black spots in the display. Thus, the shadow caused by applying spacers randomly will decrease the display performance of the LCOS panel.

Another conventional method of controlling the cell gap is to form slender protrusions between the pixels. FIG. 4 shows the sectional view of another conventional LCOS panel, wherein all pixels 402 are spaced apart from each other by a spacing 404. The pixel 402 corresponds to the display area of the LCOS panel, whereas the spacing 404 corresponds to the non-display area. The protrusion is made of curable material after UV and heating treatments, e.g. silicon dioxide or silicon nitride, and is formed in the spacing 404 with a shape having a width approximately 0.35–0.5 micron and a height approximately 3–5 micron. The protrusion is also called a photo spacer 406, which is perpendicular to the pixel 402. The photo spacer 406 formed in the spacing 404 is able to uphold the space between the glass substrate and the silicon substrate so as to uniformize the cell gap. Even so, such method has several disadvantages; for example, the slim structure of said photo spacer 406 causes process difficulty and said photo spacer is vulnerable for its lack of sustentation. Furthermore, the bottom part of said photo spacer is likely to have deformation when affected by the heat in the process. If the bottom deformation is too severe, it may cover up the pixel 402 partially, as shown in the dotted line 406 of FIG. 4, thereby hampering the aperture ratio of the pixel 402; on the other hand, the liquid crystal is susceptible to contamination during the process.

For the above, a solution is desirous as to how to maintain a uniform cell gap width H in order to prevent a Newton ring and display an excellent picture quality.

SUMMARY OF THE INVENTION

The present invention is intended to provide a device for manufacturing a liquid crystal display panel with uniform cell gap and its fabrication method. By virtue of a device capable of pressure distribution, the objective of cell gap control in avoidance of a Newton ring is attained.

The other objective of this invention is to provide a cell forming apparatus and a cell forming process aimed at producing a liquid crystal display panel with high aperture ratio.

The cell forming apparatus includes at least a pressurized device and a pressure distribution device, wherein the pressurized device is utilized to assemble a first substrate and a second substrate, and the pressure distribution device is used to distribute the pressure imposed on the panel in an attempt to create a regular cell gap. The aforesaid pressure distribution device can be a mask having a number of dents corresponding to the display areas of the panel and connecting to each other with trenches.

According to the present invention, the cell forming process refers to exerting evenly distributed pressure on a first substrate and a second substrate, sealing the first substrate and the second substrate thereafter with sealant so as to enhance the uniformity of a cell gap. Meanwhile, the aforesaid pressure exertion area does not include a display area of the substrate.

According to the invention, manufacture of a liquid crystal display panel comprises a step of providing a cell forming apparatus at least including a pressurized device and a pressure distribution device. A first substrate and a second substrate on said cell forming apparatus are provided. Pressure on at least one of the first substrate and the second substrate by said pressurized device of the cell forming apparatus is imposed to assemble a liquid crystal display panel. The pressure distribution device is provided between the pressurized device and one of the first substrate and the second substrate, for distributing pressure when the pressurized device imposes pressure on at least one of the first substrate, and the second substrate, thereby forming a uniform cell gap.

For the objects of the present invention, it addresses a method for manufacturing a liquid crystal display panel. The panel comprises a plurality of display areas and a plurality of non-display areas, and is assembled by a first substrate and a second substrate with sealant. The cell forming process is fulfilled by 20 utilizing a manufacturing device. The manufacturing device includes, a first hot plate, a second hot plate, a first cushion, a second cushion and a mask, wherein the first cushion is disposed in the inner side of the first hot plate, the second cushion is disposed in the inner side of the second hot plate, and the mask is sandwiched between the first cushion and the second cushion. The first cushion and the second cushion are used to equally distribute the heat energy passed on by the first hot plate and the second hot plate. The mask includes a plurality of dents (recesses) and a plurality of trenches connecting to each other, and a plurality of outlets are formed on the edge of the mask in communication with the external air.

The cell forming process includes the steps of: heating the first hot plate and the second hot plate; placing a panel between the second cushion and the mask wherein the dents of the mask correspond to the display areas of the panel and the other portions correspond to the non-display areas of the panel; then, exerting pressure on the first hot plate so as to press down the first hot plate along with the first cushion and the mask in completing the cell forming process after the sealant has been cured; and finally, removing the first hot plate, the first cushion and the mask above the panel to retrieve the panel.

The present invention offers a method for manufacturing a liquid crystal display panel. The liquid crystal display panel includes a plurality of display areas and a plurality of non-display areas, and is constructed by a first substrate and a second substrate with sealant. The cell forming process is accomplished by utilizing a manufacturing device. The manufacturing device comprises a hot plate, a heat-conducting plate, a mask, and a silicone membrane, wherein a vacuity hole is placed above the hot plate and the heat-conducting plate is deposited on the hot plate to distribute the heat energy coming from the hot plate evenly and the mask is situated above the heat-conducting plate and the silicone membrane is located above the mask. The mask is patterned with a plurality of dents (recesses) and a plurality of trenches in which the dents connect to the trenches. A plurality of outlets is formed on the edge of the mask so as to communicate with the external air. The cell forming process comprises the steps of: heating the hot plate; then, depositing the panel between the heat-conducting plate and the mask, wherein the dents of the mask correspond to the display areas of the panel and the other portions correspond to the non-display areas of the panel; thereafter, covering the mask with the silicon membrane so as to form a sealed space; then, vacuuming (evacuating) the sealed space through the vacuity hole to exert pressure on the sealed space; and finally, opening the vacuity hole to restore the pressure within the sealed space, and removing the silicone membrane and the mask to retrieve the panel.

By employing the manufacturing device and the method of the present invention, the liquid crystal display panel is able to generate a uniform cell gap so that the image quality can be enhanced to avoid the occurrence of a Newton ring.

BRIEF DESCRIPTION OF THE DRAWINGS

The above objects and other advantages of the present invention will become more apparently by describing in detail the preferred embodiment of the present invention with reference to the attached drawings in which.

DESCRIPTION OF THE PREFERRED EMBODIMENTS

The present invention lies in forming a regular cell gap by utilizing a mask in which the dents correspond to the display areas of the panel and the other portions correspond to the non-display areas to carry out the cell forming process. The process of the present invention is simple as compared to that of a conventional method since it does not require applying any spacer in the liquid crystal layer. Moreover, the manufacturing cost will not increase as the cell forming process. The following is the detailed description of the preferred embodiments of the present invention. Nevertheless, the manufacturing device designed in accordance with the present invention can be applicable in the cell forming process of the conventional liquid crystal panel.

Figure 1:
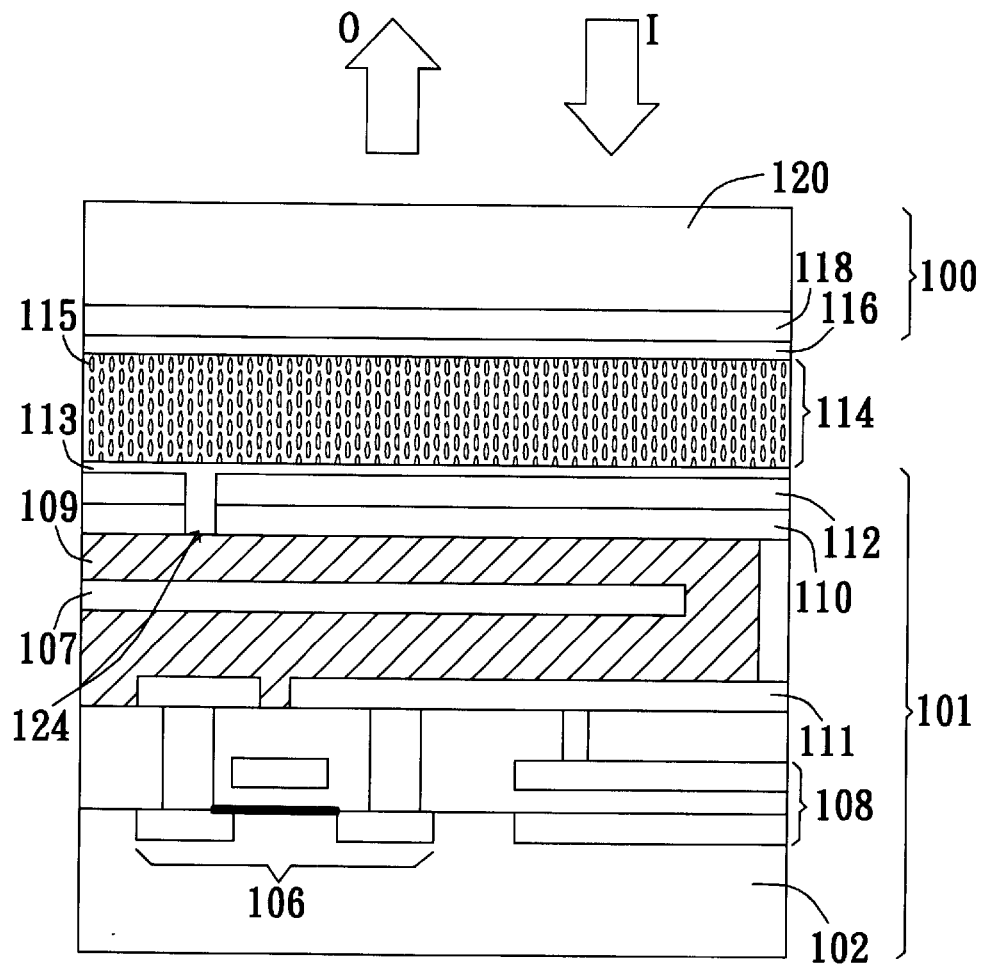
FIG. 1 (prior art) is a schematic sectional view showing a pixel of a reflective LCOS panel.
Figure 2:
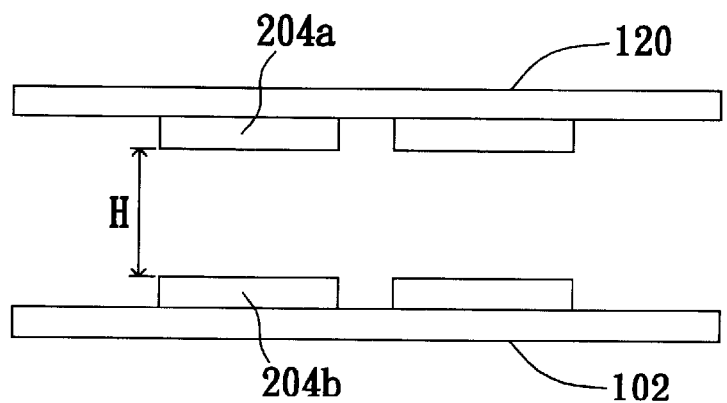
FIG. 2 (prior art) is a schematic diagram of FIG. 1.
Figure 3:
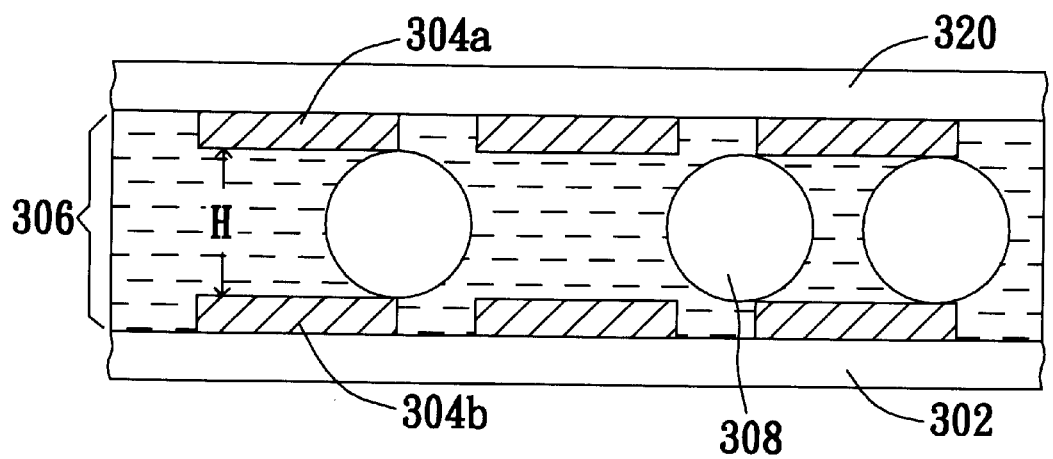
FIG. 3 (prior art) is a schematic sectional diagram showing a conventional LCOS panel.
Figure 4:
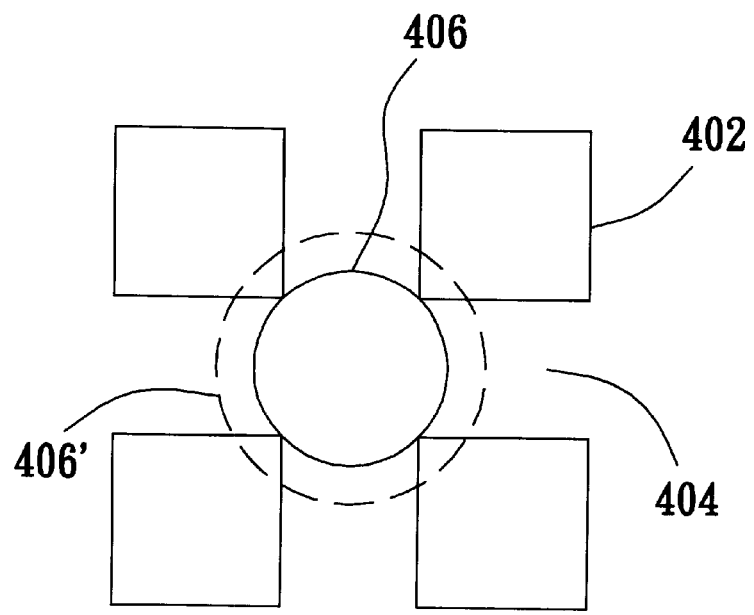
FIG. 4 (prior art) is a schematic sectional diagram depicting a conventional LCOS panel.
Figures 5A, 5B, 5C:
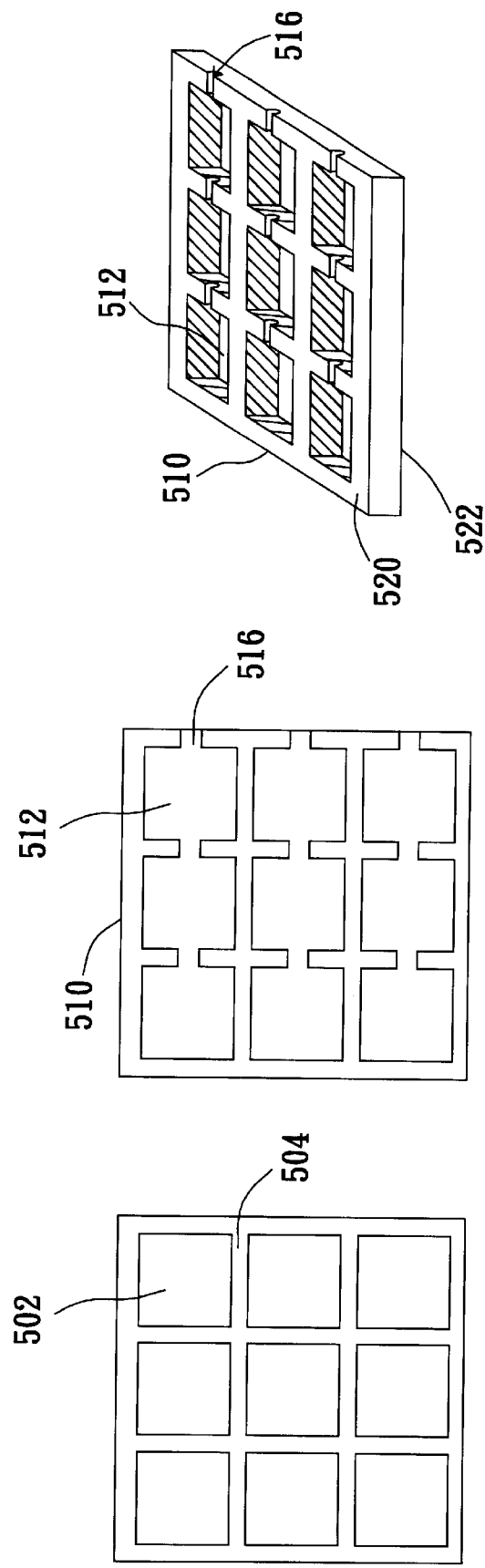
FIG. 5A is a top view of a LCOS panel.
FIG. 5B is a top view of one embodiment of this invention.
FIG. 5C is a stereographic (perspective) view of FIG. 5B.

As shown in FIG. 5A depicting nine pixels for illustration, pixel 502 is spaced apart from each other by spacing 504.

As shown in FIG. 5B, a mask 510, e.g. made of acrylic material, possesses the dent 512 corresponding to pixel 502 wherein the dents 512 connect to each other 10 via a trench 516, having an outlet on the edge of the mask 510. With reference to FIG. 5C showing the stereographic view of FIG. 5B, an important aspect is that the dent 512 formed on the mask 510 is running from top 520 through bottom 522 and that the trench 516 in connection with the dent 512 is formed either on the top 520 or through the bottom with one end extending outside the mask 510.

Figure 6:
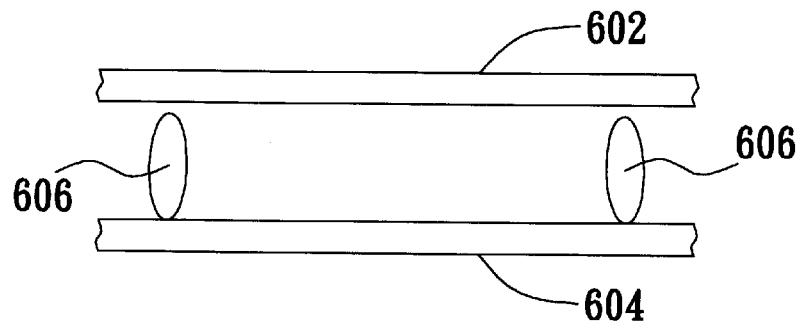
FIG. 6 schematically shows a diagram of another embodiment of this invention.

As shown in FIG. 6, a sealant 606 is applied along the edge of (not shown in FIG. 6) a substrate 604 and UV gel is further applied to cause curing of the sealant 606. Thereafter, the cell forming process by utilizing the said mask is performed on the LCOS panel in order to generate a uniform cell gap, approximately 15–20 micron. The manufacturing device employed in the cell process is hot press apparatus and vacuum press apparatus, for example. An explanation with respect to the aforesaid two apparatus is given below.

Figure 7:
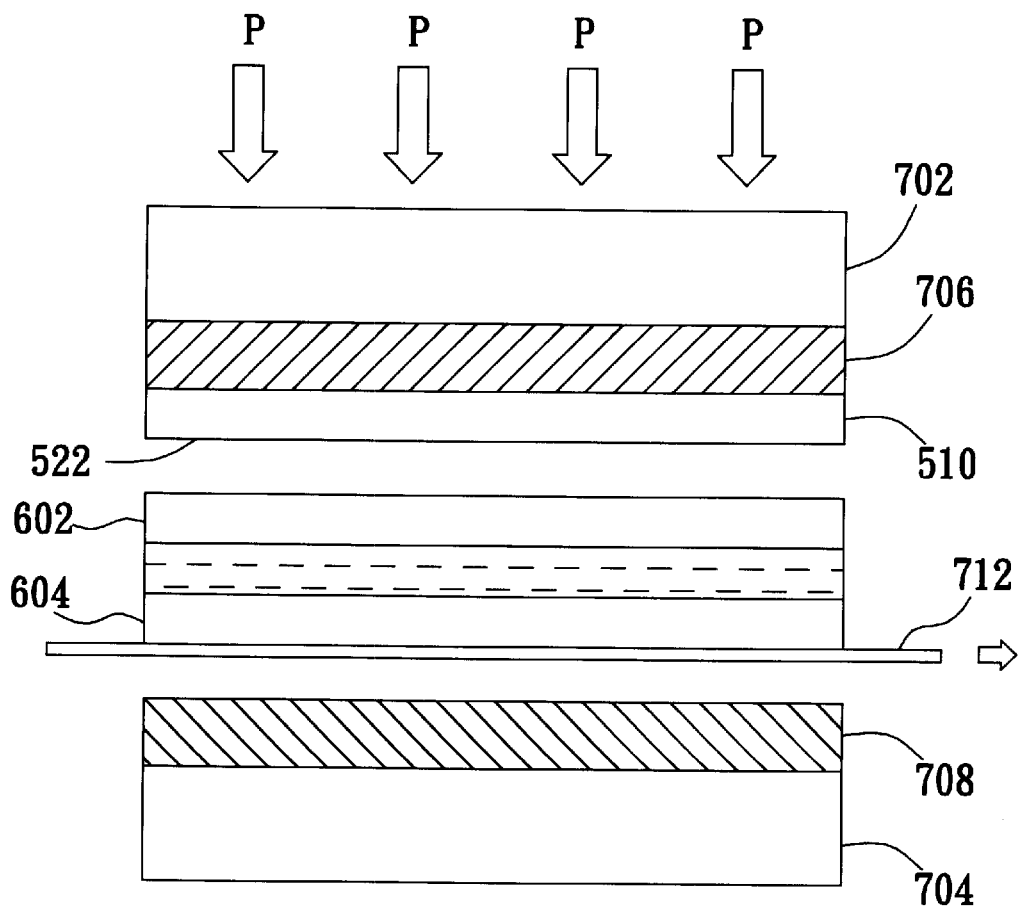
FIG. 7 is a schematic diagram of the cell forming process of the LCOS panel in utilization of the mask according to the present invention.

As shown in FIG. 7, the hot press apparatus includes hot plates 702, 704 and cushions 706, 708, which are placed below the plate 702 and above the plate 704, respectively. A mask 510 is deposited below the cushion 706, and a LCOS panel 602, 604 is placed on a conveyor belt 712. The cushions 706 and 708 which are made of soft material works to evenly distribute the heat energy passed on by the hot plate 702 and 704 in avoiding the occurrence of partial overheating during the cell forming process as well as absorbing partial overstress. At the beginning, the hot plates 702, the cushion 706 and the mask 510 exert pressure P on the LCOS panel simultaneously, and the heat energy generating from the heat plates 702, 704 pass through the cushions 706, 708 to make the sealant 606 cure. The dents 512 of the mask 510 correspond to the pixel 502 (display area), while the other portions correspond to the space 504 (non-display area). The trenches 516 of the mask 510 face either the cushion 706 or the substrate 602.

Figure 8:
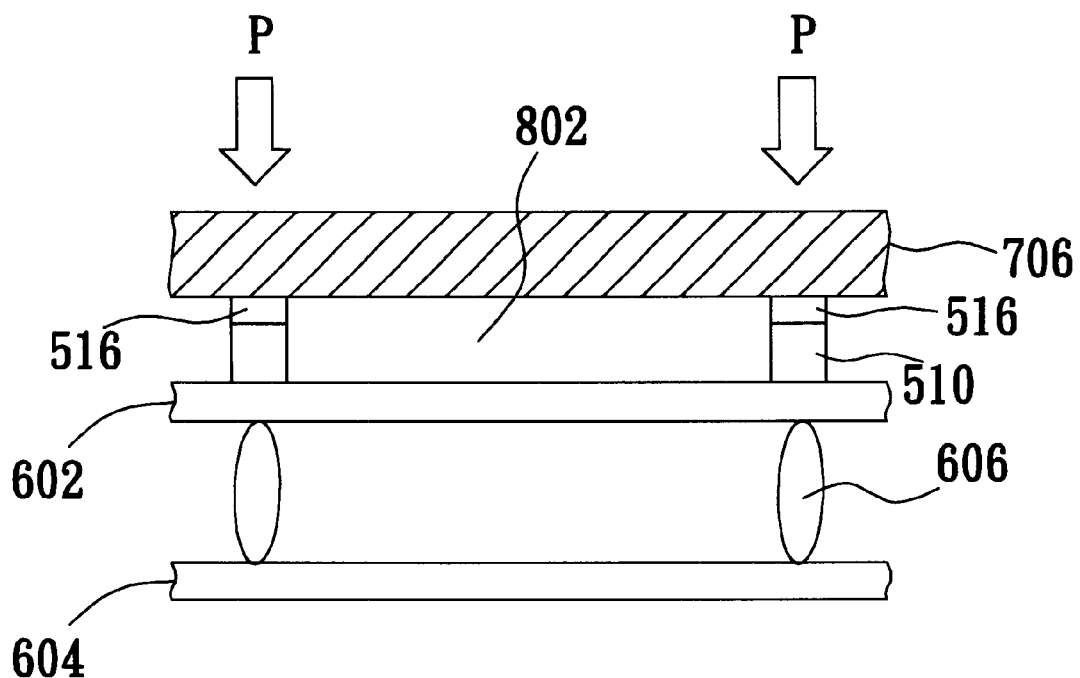
FIG. 8 is an enlarged partial diagram of FIG. 7 in performing the cell process.

As shown in FIG. 8, when the LCOS panel undergoes the cell forming process, only the space 504, not the pixels, is subject to a local pressure. As the sealant 606 inserted between the substrates 602, 604 is made of some fiber material, it can sustain stress and prevent contact between the substrate 602 and the substrate 604. Furthermore, when the cushion 706 and the mask 510 press closely on the substrate 602, the non-dent portion will have direct contact with the substrate 602 and a chamber 802 will be formed between the cushion 706 and the dents of the mask 510. In the hot press process, the heat energy will conduct to the cushion 706 and indirectly increase the temperature inside the chamber 802. While the temperature within the chamber 802 is getting higher, the pressure is increasing; therefore, there is a likelihood of transformation on the substrate 602. To circumvent this problem, the mask 510 has the trench structure 516 (as shown in FIG. 5C) for releasing the air circulating within the chamber 802 to outside the mask. As above, the trench 516, acting as an outlet, is designed for the purpose of keeping a balance between the air pressure inside the chamber 802 and the outside atmosphere. Without limitation to the methods illustrated in FIGS. 5B–5C, the trench connection can be vertical, crosswise, or any other methods. A uniform cell gap can be achieved by connecting dents with trenches and having an outlet for expelling air.

As described above, the object of forming a uniform cell gap on the LCOS panel can be achieved by utilizing a mask in the cell forming process. The said mask has dents and trenches, and such trenches connect with the external atmosphere. In performing the cell process, the dent is aimed at the pixel (display area) while the 10 non-dent portion is concentrated on the non-display area. A local pressure, aimed at the non-display area portion, is exerted on the LCOS panel and the connecting trenches function as outlets to let go the air above the substrate to the outside, thereby generating a regular cell gap.

Figure 9:
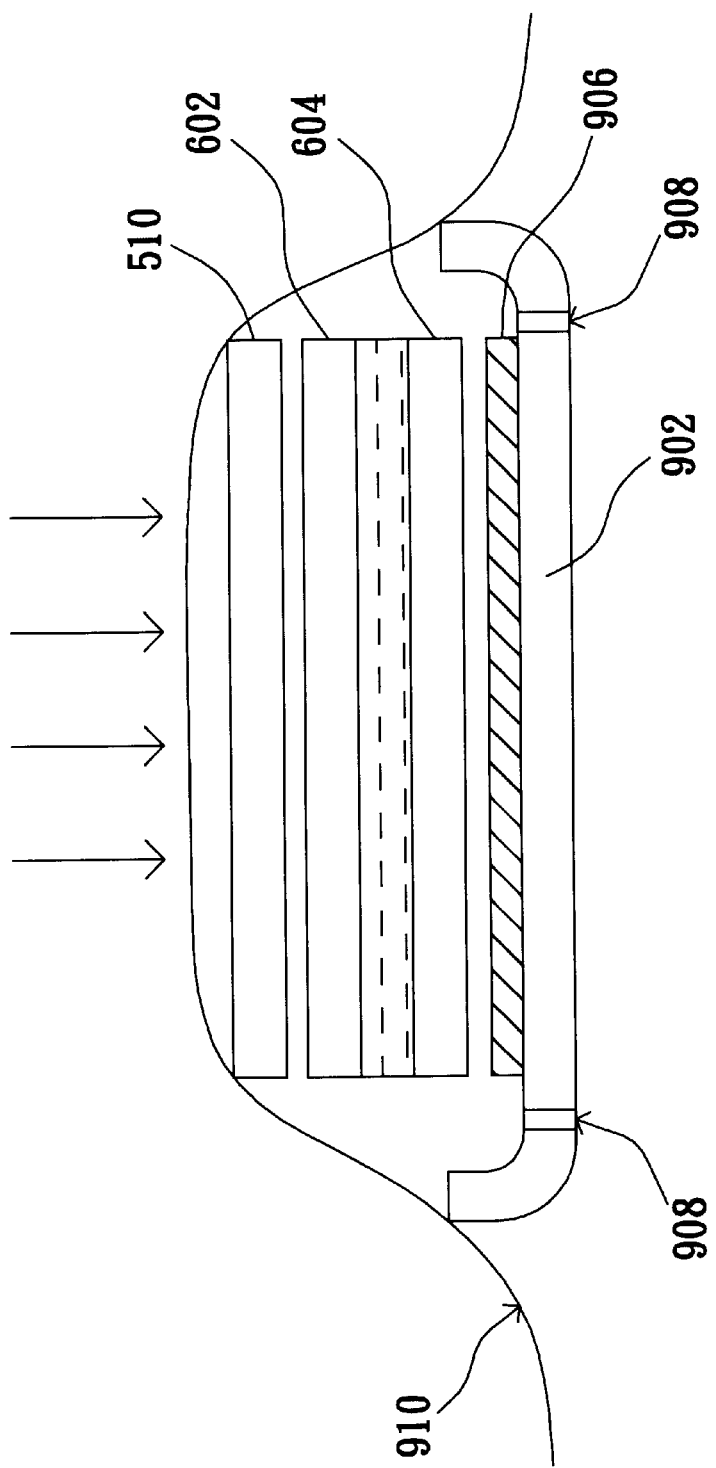
FIG. 9 is a schematic diagram of the cell forming process in utilization of the mask according to the present invention.

In addition to the above-disclosed hot press apparatus, the vacuum press apparatus is also frequently seen in the cell forming process. As shown in FIG. 9, the vacuum press apparatus has a heat plate 902 with vacuity holes on both the right and left side. A heat-conducting plate 906 is disposed above the hot plate 902, acting as the cushion 706 in the hot press, in order to secure even heat distribution. A LCOS panel and a mask are accordingly stacked on the heat-conducting plate 906. Thereafter, a silicon membrane 910 covers the heat plate 902, the heat-conducting plate 906 and the LCOS panel to form a sealed space. In the cell forming process, the air below the silicon membrane 910 will be evacuated via the vacuity hole 908 thereby generating a downward pressure on the LCOS panel. The substrates 602, 604 are thus assembled.

Although the aforesaid embodiments are illustrated with reference to the hot press apparatus and vacuum press apparatus, under the spirit of this invention, the mask contemplated according to this invention can find application in any press machine without limitation to the above-mentioned. For example, the press machine with UV-irradiation can achieve an equal cell gap in utilization of the mask according to this invention.

Still further, the mask contemplated according to this invention can also apply to the traditional manufacturing process for liquid crystal panel. The usual methods for solving the uneven cell gap problem is dispersing spacer or forming photo spacer between pixels. Such conventional processes can utilize said mask to obtain an even cell gap. Moreover, the above explanation of the embodiments is focused the production process of the LCOS panel, but the mask contemplated according to this invention and the aforesaid cell process are capable of finding application in all manufacturing process of liquid crystal display panel.

The advantage of this invention disclosed in the above embodiments is to manufacture a panel with a regular cell gap so as to enhance the image quality and prevent a Newton ring. Furthermore, a uniform cell gap can be obtained by utilizing the conventional manufacturing device, e.g. hot press and vacuum press, together with the mask contemplated according to this invention without increasing manufacturing cost.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. An apparatus for manufacturing a liquid crystal display panel with a uniform cell gap, said apparatus comprising:

a pressurized means for assembling a first substrate and a second substrate of the liquid crystal panel, said pressurized means generating heat energy for heating said liquid crystal display panel, wherein said pressurized means is disposed on at least one of the first substrate and the second substrate;

pressure distribution means, disposed between said pressurized means and one of said first substrate and said second substrate, for distributing pressure imposed by said pressurized means evenly on a non-display area of said liquid crystal display panel so as to form a uniform cell gap; and heat distribution means disposed between said pressurized means and one of said first substrate and said second substrate, for distributing the heat energy generated by said pressurized means;

wherein said pressure distribution means includes a mask with a substantially same pattern as the non-display area of said liquid crystal display panel, and said mask has a plurality of dents corresponding to a display area of said liquid crystal panel, and a plurality of trenches connected with said dents.

2. The apparatus of claim 1, wherein said mask has a plurality of outlets connected with said corresponding dents to communicate with the external air.

3. A device for manufacturing a liquid crystal display panel wherein said liquid crystal panel has a first substrate and a second substrate, said device carrying out the cell forming process of assembling said first and said second substrates by means of sealant, the device at least comprising:

at least one hot plate;

at least one cushion deposited in the inner side of said at least one hot plate to distribute the heat energy coming from said at least one hot plate;

a mask deposited in the inner side of said at least one cushion, comprising a plurality of dents and a plurality of trenches, wherein said trenches connect to said dents and form a plurality of outlets on the edge of said mask in communication with the external air.

4. The device of claim 3 wherein dimensions of said dents are approximately equivalent to that those of display areas of said liquid crystal display panel.

5. The device of claim 3 wherein the pattern of the non-dent portion of said mask is approximately equivalent to that of non-display areas of said liquid crystal display panel.

6. The device of claim 3 wherein said trenches on the edge of said mask corresponding to said dents form a plurality of outlets.

7. A device for manufacturing a liquid crystal display panel wherein said panel has a first substrate, a second substrate and a sealant in assembling said first substrate and said second substrate, said device comprising:

a hot plate having a vacuity hole thereon;

a heat-conducting plate situated above said hot plate for evenly distributing the heat energy passed on by said hot plate;

a mask situated above said heat-conducting plate, including a plurality of dents and a plurality of trenches, wherein said trenches connect said dents and form a plurality of outlets on the edge of said mask in communication with the external air; and a silicon membrane on the top of said mask to form a sealed space.

* * * * *